UNITED STATES PATENT OFFICE 2,271,171

PROCESS FOR TREATING TUBERS TO DESTROY PARASITES

Willem Eduard de Mol, Amsterdam, Netherlands

No Drawing. Application January 18, 1940, Serial No. 314,561. In the Netherlands February 13, 1939

4 Claims. (Cl. 21—3)

This invention relates to a process for treating tubers, such as bulbs or onions, in order to destroy parasites in or on the tubers. Among parasites of this kind, which are harmful for bulbs and the like, may be mentioned *Merodon equestris* and *Eumerus strigatus*, which are found associated with narcissi.

The customary method of combating these parasites in the case of narcissi and hyacinths consists in immersing the bulbs in water having a temperature of 43½° C. for a period of 2-4 hours and then drying them. Experience has shown that this treatment mostly suffices to destroy the larva.

However, this method is subject to drawbacks. Some varieties of bulbs will not withstand a treatment with warm water. Furthermore, the larvae are not always destroyed by the immersion of the bulb in water of 43½° C.; on the other hand, it is not desirable to apply higher temperatures, since the bulbs cannot withstand them. In this way the larvae are unintentionally selectively destroyed in the sense that those having the greatest resistance remain alive.

Bulbs which have been strongly eroded by larvae would become filled with water during the treatment and would then require a very long period to dry. When the bulbs are subsequently stored in a shed, they will become heated and thereby suffer considerable damage. Furthermore this method has the drawback that in the year of the treatment the plant does not produce a flower. It has therefore been attempted to find a method which will destroy the larva without need for wetting the bulb and will have no disadvantageous effects on the bulb. It may be mentioned that it is impossible to use for this purpose various poisonous gases, such as hydrocyanic acid, because they would affect the bulb and its new sprout. As a rule, the resistance of the parasite is greater than that of the sprout in the bulb, so that the usual means for destroying such parasites cannot be applied.

The invention provides a process whereby parasites in or on tubers can be destroyed effectively without damage to the bulb. The process consists in subjecting the bulbs in a closed space to a treatment under pressure with a mixture of carbon dioxide and oxygen of which the carbon dioxide constitutes less than 50 per cent by volume. The favourable effect thereby achieved is not attained by applying carbon dioxide and oxygen separately under the same conditions. Carbon dioxide under pressure destroys the vegetable protoplasm, so that the bulbs soften and die, whilst oxygen under pressure does not destroy the larvae. By using mixtures of carbon dioxide and oxygen of the above composition under pressure the larvae are destroyed and the bulb with its new sprout is not in the least damaged.

The duration of the treatment is related to the magnitude of the pressure in the sense that the lower the pressure the longer must be the duration of the treatment. The duration of the treatment is also influenced by the season. In summer it is a minimum and should be increased as the year progresses further; it can, however, again be reduced by exposing the bulbs to a relatively slight heating prior to and during the treatment.

The invention is illustrated by the following example:

Specimens of bulbs are selected which contain one or more larvae. Such bulbs show one or more small holes and/or are soft to the feel. They are introduced into an iron vessel, for example, an iron tube of 3 m. length, 10 cm. internal diameter and 15 mm. wall thickness, which is connected with a manometer. The tube is then closed at one end by means of a screw cap. Carbon dioxide is then introduced by way of a tap at the other end of the tube until the manometer indicates a pressure of 2 atmospheres and the tap is then closed. The hand of the manometer will then recede slightly, indicating that the carbon dioxide has penetrated into the bulbs. Further carbon dioxide is then introduced until the manometer indicates a constant pressure of 2 atm.

Oxygen is now introduced by way of the tap until the pressure has risen to 10 atmospheres and the tap is again closed. Should the hand of the manometer recede somewhat, a further small amount of oxygen is introduced. Within some hours the manometer will indicate a constant pressure of 10 atmospheres, this pressure having, therefore, been attained with a mixture of 20% of carbon dioxide and 80% of oxygen. The bulbs are kept under a pressure of 10 atmospheres for 24 hours, whereupon the tube is opened and the bulbs are removed. The larvae have been destroyed. The bulbs have remained completely dry and have suffered no damage, as is evident on opening them and examining the new sprout.

It is found that the method of carrying out the invention described above is wholly efficacious during summer, when the larva is still in the first stage of its development.

As the year progresses, the larvae gain in resistance. The abovedescribed treatment at 10 atmospheres pressure for 24 hours destroys a considerable number, but not all, of the larvae. However, the pressure, as well as the duration of the treatment, may now be increased. It appeared that by treatment at 12 atmospheres pressure for 48 hours with the same mixture (20% $CO_2$+80% $O_2$) even slowly pupating larvae were destroyed quantitatively. Moreover, some heat may now be applied in order to shorten the treatment.

In practice, however, the bulbs will not usually be treated at so late a stage, but at a time when the larvae are considerably younger.

What I claim is:

1. Process for treating tubers in order to destroy parasites associated therewith which comprises subjecting a tuber in a closed space to contact with a mixture of carbon dioxide and oxygen containing from about 20% to about 50% by volume of carbon dioxide for at least about 24 hours at a pressure of at least about 10 atmospheres.

2. Process as defined in claim 1 in which the tuber is a narcissus.

3. Process as defined in claim 1 in which the parasite associated with the tuber is a member of the group consisting of *Merodon equestris* and *Eumerus strigatus*.

4. Process as defined in claim 1 in which the closed space containing the tuber is first filled with carbon dioxide under pressure and the treatment of the tuber therewith continued until the pressure remains substantially constant and oxygen under pressure is then introduced into the closed space and the treatment of the tuber with the resulting gas mixture continued until the pressure remains substantially constant.

WILLEM EDUARD DE MOL.